United States Patent Office 3,076,655
Patented Feb. 5, 1963

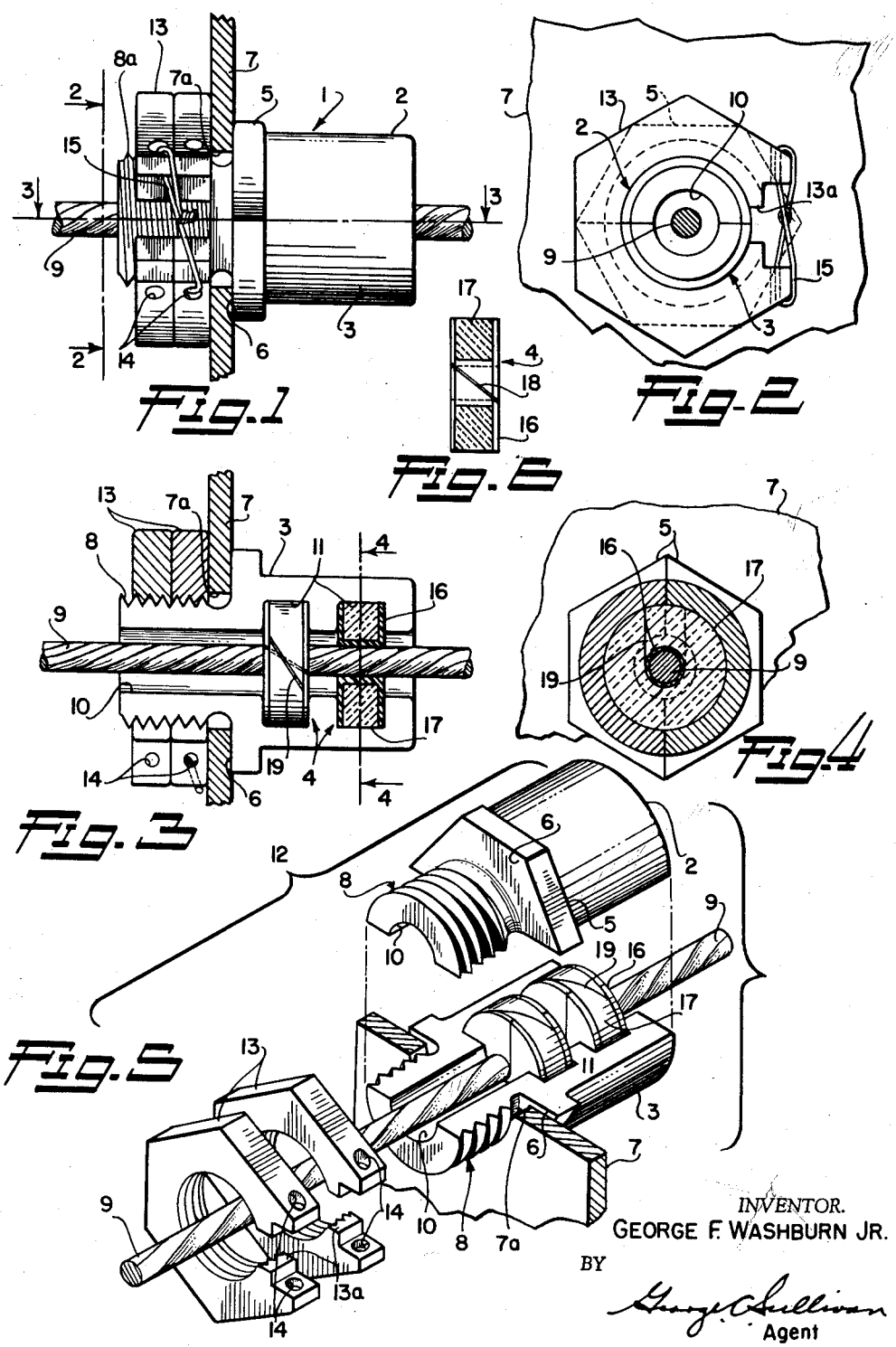

3,076,655
SPLIT SEAL
George F. Washburn, Jr., Atlanta, Ga., assignor to Lockheed Aircraft Corporation, Burbank, Calif.
Filed July 21, 1958, Ser. No. 750,551
4 Claims. (Cl. 277—4)

This invention concerns a cable seal, and more particularly devices for sealing around control cables passing through firewalls or bulkheads to prevent passage of fire or flames therethrough should a fire occur.

Methods of accomplishing control cable movements or adjustments past a stationary firewall or bulkhead other than having the cable pass through the firewall, such as rotating sealed shafts, or sealed lever or push-pull rod combinations, etc., are known and have been used previously. However, this type of approach adds considerable complexity to such a system as compared to having the cables pass directly through an opening in the firewall. Control cables passing through firewalls require freedom for longitudinal movement, and to allow for such while preventing passage of fire, which is the purpose of the firewall, requires a seal around the cable at the firewall opening.

The seal must allow the cable to be somewhat freely movable therethrough, while at the same time prevent or contain any fire from passage through the firewall, as required by Civil Areonautics Administration, Civil Air Regulation 4b.486(b) and (c) for aircraft applications. The duration of flame leakage prevention and extent of fire temperatures to be withstood can differ from various functions or installations, as such depend upon the conditions to be met. The embodiment of this invention presented here meets the above identified Civil Aeronautics Administration requirements of withstanding a 2000° F. temperature for a period of 15 minutes.

As indicated above, the cable must be able to freely slide back and forth through the seal, which in turn may require replacement of parts subject to wear by the relative slide motion between the cable and seal. Any such replacement is accomplished by one of the features of this invention without having to restring or reinstall the cable, thus providing great ease of servicing.

Accordingly, it is an object of this invention to provide a seal for cable passing through a bulkhead permitting easy movement or adjustment of the cable.

It is another object of this invention to provide a seal for cable passing through a firewall allowing easy movement of the cable and yet preventing fire or flame leakage through the firewall should fire occur.

It is a further object of this invention to provide a seal for cable passing through a bulkhead that is easily serviced once installed.

It is still another object of this invention to provide a seal for cable passing through a bulkhead wherein parts subject to wear or the complete seal can be replaced without requiring disassembly and subsequent restringing or assembly of the cable system.

A still further object of this invention is to provide a seal for cable passing through a bulkhead that is inexpensive and of simple design with few parts.

Further objects and advantages of this invention will become apparent from the following description taken in connection with the accompanying drawings in which:

FIGURE 1 shows one embodiment of this invention in assembled and installed position relative to a firewall and a cable passing therethrough;

FIGURE 2 is a view taken along line 2—2 of FIGURE 1;

FIGURE 3 is a view taken along line 3—3 of FIGURE 1;

FIGURE 4 is a view taken along line 4—4 of FIGURE 3;

FIGURE 5 is an exploded perspective of the invention embodiment depicted in FIGURE 1, showing the relative locations of all parts when assembled; and FIGURE 6 is a partial cross-sectional view of one of the fireproof washers used in the seal.

Generally stated, the invention comprises a split metallic bushing assembly having a shoulder flange around the periphery thereof. Each bushing member is serrated on the outer surface from the shoulder to one end of the member, the serratures forming a continuous screw thread from the ends of the split bushing members to the shoulder when the split bushing members are assembled in the proper relation to each other. Each of the split bushing members has a semi-circular groove or channel running the length thereof forming an axial opening through the bushing assembly when the bushing members are assembled in their proper relation; the axial opening allowing passage of a cable through the bushing assembly. There are two annular grooves axially spaced in the axial passage through the bushing assembly in which seat a pair of washers of fireproof material, each washer having a ring of small radial depth around the inner surface thereof seating on the cable passing through the bushing assembly. This ring consists of a material having a slight or small coefficient of friction relative to the cable to allow ease of movement of the cable relative to the washers and the bushing assembly.

The seal assembly is held in place by two nuts, which are slotted for ease of mounting on, or passing over, the cable and which engage the threaded portion of the bushing assembly thus securing the shoulder of the bushing assembly against one of the side surfaces of a bulkhead or firewall which the cable passes through, as a side of one of the nuts securedly engages the other side surface of the bulkhead or firewall.

Referring more particularly to the drawings, FIGURES 1, 2 and 5, the numeral 1 indicates a bushing assembly comprising semicylindrical metallic bushing members 2 and 3 of semi-annular transverse cross-section and a pair of seal washers 4. The bushing members 2 and 3 have a flange portion 5 around the outer surface thereof forming a shoulder surface 6 for abutment against one of the side surfaces of a bulkhead or firewall 7 having a passage or opening 7a therein when the seal assembly is mounted in position. From the shoulder 6 to the adjacent ends of bushing members 2 and 3 are a plurality of serratures 8 arranged to provide threads 8a when bushing members 2 and 3 are positioned to form bushing assembly 1.

In order to form an axial passage through bushing assembly 1 for cable 9 passing through opening 7a in firewall 7, there is a semi-circular channel or groove 10 extending the length of each of the bushing members 2 and 3. Each of the bushing members 2 and 3 contain a pair of spaced recesses 11, which are coaxial with groove 10 and serve to form annular seating grooves for washers 4 when bushing members 2 and 3 are positioned to form bushing assembly 1.

The overall seal assembly, as indicated by 12 in FIGURE 5, is completed by the mounting of a pair of threaded nuts 13 onto the threads 8a of bushing assembly 1, it being noted that the nuts 13 are slotted at 13a to permit placement or removal of nuts 13 around cable 9, the purpose of which will be explained in more detail hereinafter. Openings 14 in nuts 13 are provided to secure the nuts 13 in assembled position by safety wire 15.

Referring to FIGURES 3, 4 and 6, the seal washers 4 comprise an assembly of a spool 16 containing an annular ring of fire resistant material 17. Both the spool 16 and fireproof ring 17 are longitudinally slotted or cut through the lengths thereof to permit assembling of the seal assembly 12 on the previously rigged cable 9, as indicated by 18 and 19 respectively, it being noted that slits 18 and 19 have different relative angulations to the axis of the spool 16 and ring 17. The inner diameter of spool 16 slidingly bears on the surface of cable 9 as it is moved longitudinally relative to the seal assembly 12, making it thus preferable that the material of spool 16 have a relatively low coefficient of friction relative to the material of cable 9, as for example, Teflon. The preferred material for ring 17 is a wire braided asbestos, although it is to be understood that any appropriate fireproof material may be utilized.

Installation of seal assembly 12 is accomplished by mounting the slid washers 4 on the already rigged cable 9 that passes through an opening 7a in a bulkhead or firewall 7. Bushing members 2 and 3 are then placed around cable 9 with the washers 4 seated in recesses 11 in bushing members 2 and 3 to form bushing assembly 1. Bushing assembly 1 is then slidingly moved along cable 9 until shoulder 6 abuts against one of the side surfaces of firewall 7 with the threads 8a of bushing assembly 1 extending from the opposite side surface of firewall 7. The seal assembly 12 is completed and held in place by the placement of slotted nuts 13 around the cable 9 and screwing them onto threads 8a of bushing assembly 1 until the innermost nut abuts against the adjacent side surface of firewall 7, whereupon safety wire 15 is installed to prevent inadvertent loosening of nuts 13.

By having the washers 4 of fireproof material and in engagement with the circumferential surface of cable 9, there is effected a seal against fire or flame leakage from one side of firewall 7 to the other, while permitting unrestricted longitudinal movement of cable 9 relative to firewall 7. Easy movement of cable 9 through seal assembly 12 is accomplished by providing spool 16 of a material having a relative low coefficient of friction relative to the material of the cable, spool 16 being the only material of seal assembly 12 that cable 9 comes into contact with inasmuch as the dimension of the axial opening through bushing assembly 1 formed by the semicircular channels 10 being sufficiently larger than the dimension of the cable 9 so as to preclude contact between the surfaces of cable 9 and channels 10.

Thus it can be seen I have provided a fire seal for a cable extending through a firewall that is easily assembled and disassembled without complexity nor disturbance to an already rigged cable. Likewise, this invention permits replacement of worn washers or the entire seal assembly without necessitating disassembly and subsequent reassembly of the cable rigging or system.

While one particular embodiment of the invention has been illustrated and described, it will be obvious to those skilled in the art that various changes and modifications may be made without departing from the invention and it is intended to cover in the appended claims all such modifications and equivalents that fall within the true spirit and scope of this invention.

What is claimed is:
1. A fire sealing device for a longitudinally movable cable passing through an aperture in a stationary bulkhead comprising a two-piece bushing having a passage therethrough and a shoulder interjacent the ends thereof, threads on the outer surface portion of the bushing between said shoulder and adjacent bushing end, at least one annular groove in said bushing passage and coaxial therewith, seal means having a longitudinal slit therethrough for mounting around the cable and locatable in said annular groove or grooves for effecting a sealing engagement about the cable when the bushing is assembled therearound, and a slotted nut having threads engageable with said bushing threads securing the shoulder of said bushing in abutting engagement with a side surface of the stationary bulkhead, said slot of a sufficient width to permit the cable to pass therethrough and of insufficient width so as to preclude said nut from maintaining the bushing shoulder in said abutting engagement when threadedly engaged with said bushing, said bushing passage diameter being sufficiently larger than the diameter of the cable whereby the only contact between the cable and sealing device is the sealing engagement of said seal means about the cable.

2. A fire sealing device for a longitudinally movable cable passing through an aperture in a stationary bulkhead comprising a two-piece bushing having a passage therethrough and a shoulder interjacent the ends thereof, threads on the outer surface portion of the bushing between said shoulder and adjacent bushing end, at least one annular groove in said bushing passage and coaxial therewith, a spool, an annular ring thereon, both said spool and annular ring having a longitudinal slit therethrough forming a slit seal means for sealing engagement mounting around the cable, said seal means seating in said annular groove or grooves when the bushing is assembled therearound, and a slotted nut having threads engageable with said bushing threads securing the shoulder of said bushing in abutting engagement with a side surface of the stationary bulkhead, the width of said slot being between a minimum to permit passage of the cable therethrough and a maximum to maintain coaction between the nut and bushing threads when both are threadedly engaged.

3. A sealing device as claimed in claim 2 wherein the slits of the spool and annular ring are at different angles to the axes thereof.

4. A sealing device as claimed in claim 2 wherein the annular ring is of a fireproof or fire resistant material, and the spool is of a material such as Teflon for a low coefficient of friction relative to the material of the cable.

References Cited in the file of this patent

UNITED STATES PATENTS

| 447,261 | Shortt | Feb. 24, 1891 |
| 725,368 | Rollins | Apr. 14, 1903 |
| 857,030 | Cook | June 18, 1907 |
| 2,355,679 | Roxs et al. | Aug. 15, 1944 |
| 2,459,721 | Poltorak | Jan. 18, 1949 |
| 2,517,693 | Mead et al. | Aug. 8, 1950 |
| 2,848,257 | Moore | Aug. 19, 1958 |

FOREIGN PATENTS

| 1,119,782 | France | Apr. 9, 1956 |